United States Patent [19]

Ohshima

[11] 4,115,266
[45] Sep. 19, 1978

[54] METHOD FOR SEPARATING FOREIGN SUBSTANCES BY MEANS OF A FILTER FORMING A FLOATING LAYER

[76] Inventor: Katsutoshi Ohshima, 2-31-1, Tokiwadai, Itabashiku, Tokyo, Japan

[21] Appl. No.: 736,689

[22] Filed: Oct. 28, 1976

[30] Foreign Application Priority Data

Jul. 14, 1976 [JP] Japan .................................. 51-82896

[51] Int. Cl.² .......................................... B01D 23/24
[52] U.S. Cl. ................................... 210/80; 210/500 R
[58] Field of Search .................... 210/65, 500 R, 79, 80

[56] References Cited

U.S. PATENT DOCUMENTS

| | | | |
|---|---|---|---|
| 3,557,955 | 1/1971 | Hirs et al. | 210/500 R X |
| 3,635,764 | 1/1972 | Setser et al. | 210/65 X |
| 3,948,767 | 4/1976 | Chapman | 210/DIG. 26 |

FOREIGN PATENT DOCUMENTS 1,204,880 9/1970 United Kingdom ...................... 210/65

Primary Examiner—William A. Cuchlinski, Jr.
Attorney, Agent, or Firm—Fred Philpitt

[57] ABSTRACT

A method for separating foreign (or extraneous) substances from a liquid containing same (such as waste water) by filtration is provided wherein said liquid is caused to flow in and out of a filtration vessel in which a large number of materials in the form of small piece, granule or powder (of e.g. atactic polypropylene) having a true or apparent specific gravity lower than or equal to that of said liquid are filled without fixing to form a floating layer as a filtering layer. Said foreign substances adhere onto the surfaces of the materials, grow into large particles, are peeled therefrom by the contacting motion of the materials with each other, float up or precipitate, and are removed.

6 Claims, 8 Drawing Figures

METHOD FOR SEPARATING FOREIGN SUBSTANCES BY MEANS OF A FILTER FORMING A FLOATING LAYER

DESCRIPTION OF THE INVENTION

This invention relates, in the method for separating and recovering plural kinds of substances contained in a liquid by utilizing the difference in s.g. therebetween, to a method for enhancing the effect of said separation and recovery by filling in a raw liquid, materials having a true or apparent specific gravity smaller than or equal to that of said raw liquid.

Heretofore, in order to separate foreign (or extraneous or impure) substances contained in a liquid by filtration, for example, sand, anthracite, etc. having a specific gravity higher than that of water have been employed as a filtering material in case of waste water of service water. For elevating the filtration efficiency, it has been necessary to tightly close the vessel containing the material and elevate the pressure up to several $Kg/cm^2$, and also for preventing the material from clogging, it has been necessary to carry out back-washing frequently. Thus, the filtration efficiency has been inevitably reduced. Particularly it has been impossible to continuously and permanently carry out filtration of SS (suspended substances), oil matters, etc. having a specific gravity lower than that of water. As for filtration method employing filter cloth, wire net, etc., such filtering materials are fixed, and in case of filter cloth, it is necessary to exchange the cloth frequently in order to prevent clogging, while, in case of wire net, etc., it is practically impossible due to their property to remove SS, oil matters, etc.

An object of the present invention is to provide a filtration method wherein the drawbacks of the past filtration methods have been overcome, namely a filtration method wherein a filtration apparatus which is simpler in structure; of a small shape but capable of continuously treating a large amount of liquid; and cheap in the manufacturing cost, maintenance cost and administration cost, can be employed, and particularly when the liquid to be treated is a waste water of service water, treatment can be carried out effectively.

Another object of the present invention is to provide a method which is applicable to either foreign substances lighter or heavier than the liquid to be treated, only by changing the flow direction of the liquid.

A further object of the present invention is to provide a method wherein purifying bacteria are attached onto the filtering material and at the same time air is blown into, whereby a remarkable reduction in the BOD of the raw liquid can be effected at the same time with the filtration of the foreign substances.

The above-mentioned objects can be attained according to the method of the present invention.

The present invention resides in a method wherein materials having never been employed in the conventional methods, that is, those having a true or apparent specific gravity lower than or equal to that of a raw liquid (a liquid to be treated) are filled in the raw liquid, to form filtering materials, which are maintained in a movable state without being fixed, and merely controlling their floating up; the flow direction of the raw liquid is optionally varied depending upon either the floating-up case or the precipitating case of the foreign substances to be separated; the foreign substances are caused to adhere onto the surfaces of the filtering materials and slowly aggregate thereon; the foreign substances adhered by the contacting motion of the materials with each other brought about by the flow of the raw liquid are stripped off the materials; the foreign substances are caused to float up or precipitate, whereby the surfaces of the filled materials are kept always clean and the raw liquid is continuously and permanently separated without clogging the clearances between the filled materials.

In the method of the present invention, a filling material having a true or apparent specific gravity lower than that of the raw liquid is employed as a filtering material, as mentioned above, and those which are most suitable for this purpose are atactic polypropylene and atactic ethylene-propylene copolymer. Porous polyethylene, crystalline polypropylene, foamed polystyrene, urethane resin, etc. in the form of flake, mat-like small piece, porous lump, pellet, etc. or natural products such as pumice, sponge, wood wool, sawdust, etc., or the foregoing materials having the total true or apparent specific gravity of the foregoing materials made lower than or equal to that of the raw liquid, by means of oils, plastics, paraffins, etc. may be also employed.

The method of the present invention will be further illustrated referring to the accompanying drawings.

Figure 3:
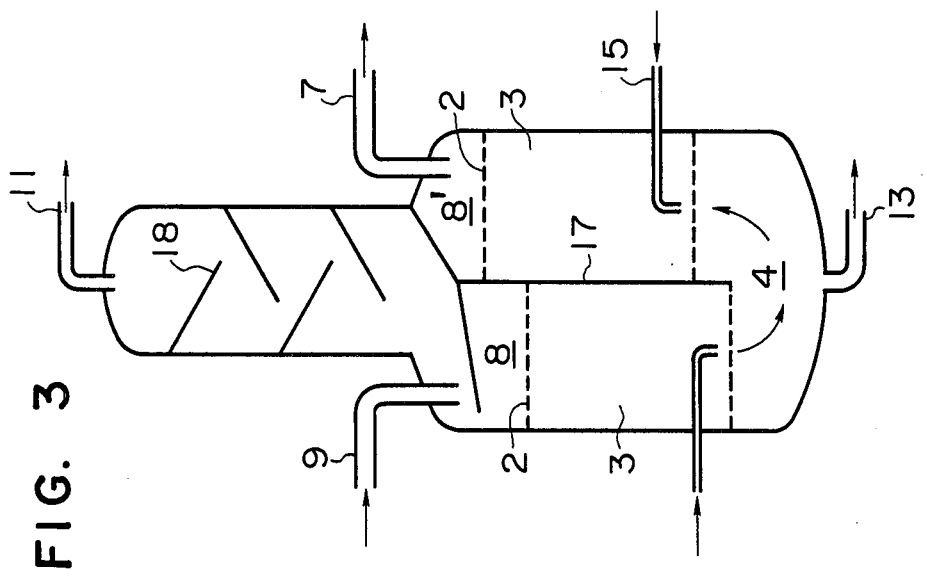

FIG. 3 shows a filtration-separation apparatus consisting of a cylindrical vessel having a diameter of about 1.8 m and a height of 2.5 m, which vessel is provided with a partition, on one side of which a raw liquid is introduced into the upper liquid-retention part and transferred at the lower end of the partition, from the lower water-retention part to the other side of the partition, and the resulting treated liquid is withdrawn from the upper liquid-retention part on the other side of the partition.

Figure 4:
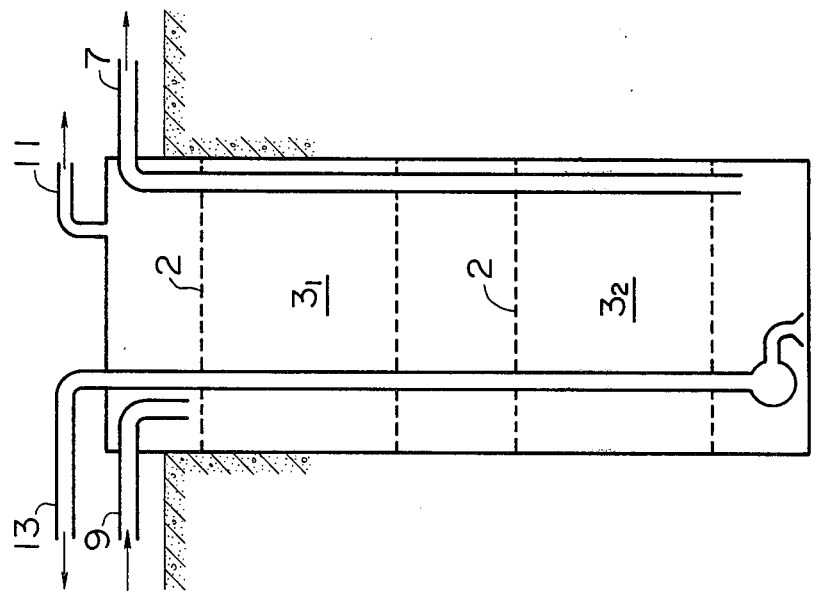

FIG. 4 shows a longitudinally cross-sectional view of an apparatus fixed underground for carrying out the method of the present invention, wherein two upper and lower stages each containing a layer of filtering materials are provided, the particle size of filtering materials contained in the former being different from that contained in the latter, and further a funnel-like part is provided midway between the two stages.

Figure 5:
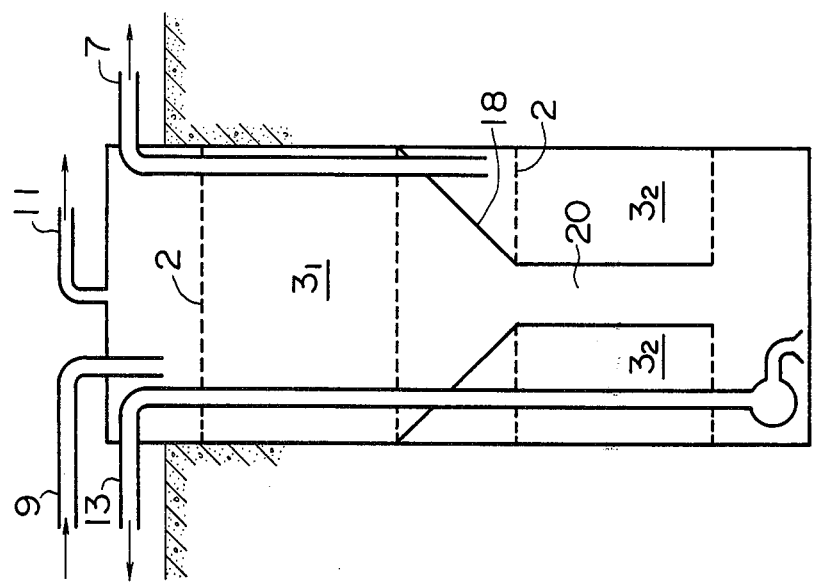

FIG. 5 shows a longitudinally cross-sectional view of an apparatus fixed underground for carrying out the method of the present invention, wherein two upper and lower stages containing each a layer of filtering materials are provided as in FIG. 4, but no funnel-like part is provided midway therebetween.

Figure 6:
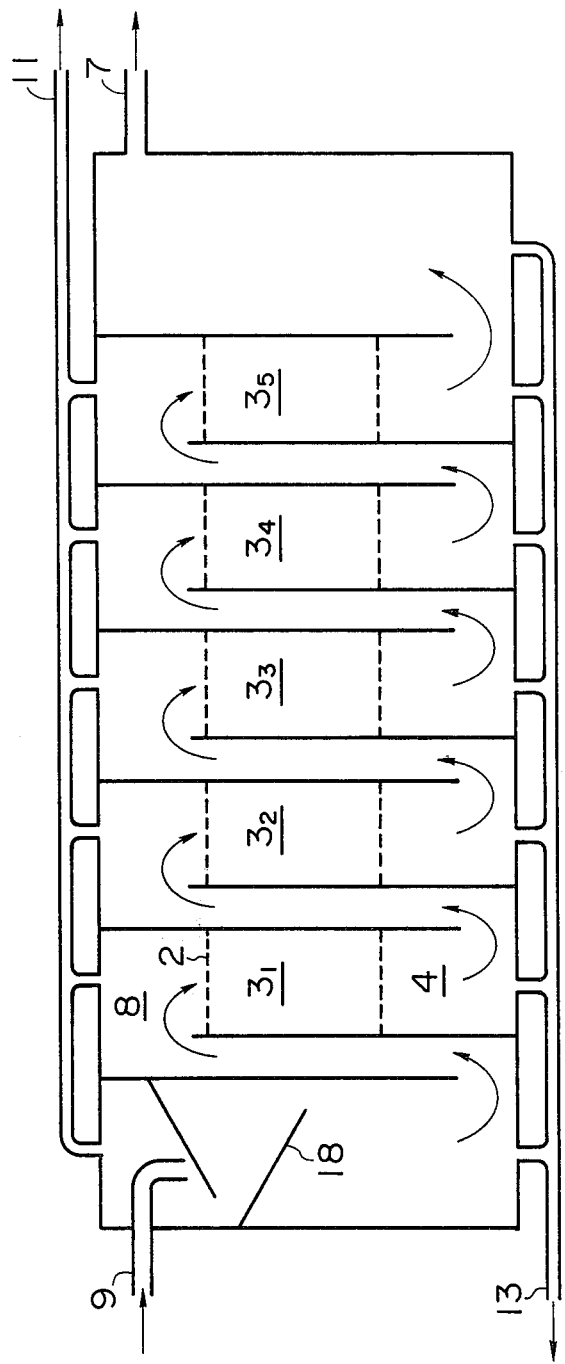

FIG. 6 shows a longitudinally cross-sectional view of an example of apparatus for carrying out the method of the present invention, wherein six stages each containing a layer of filtering materials are arranged.

Figure 7:
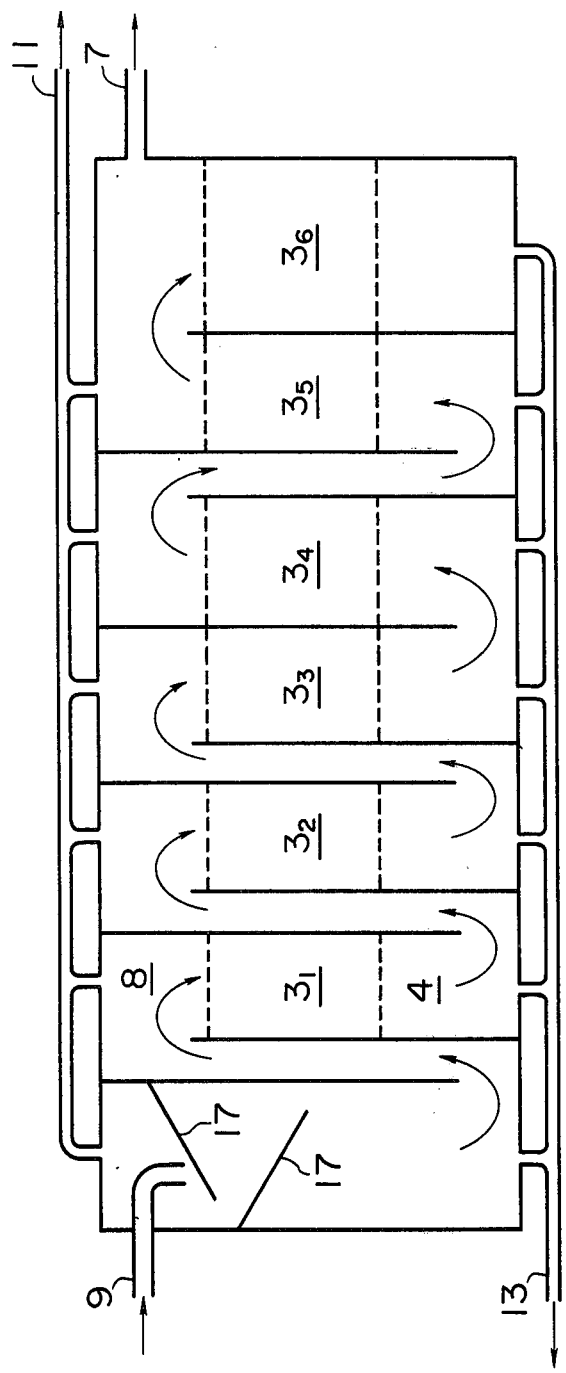

FIG. 7 shows a longitudinally cross-sectional view of an apparatus wherein six stages each containing a layer of filtering materials are arranged as in FIG. 6, but the particle size of the filtering materials at the former three stages is different from that at the latter three stages.

Figure 8:
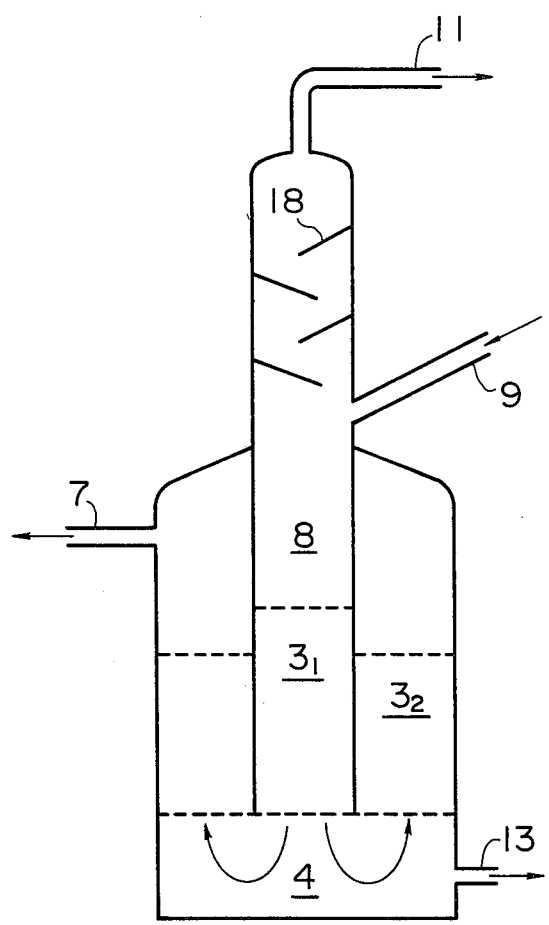

FIG. 8 shows a longitudinally cross-sectional view of an apparatus wherein two stage filtration is carried out.

Figure 1:
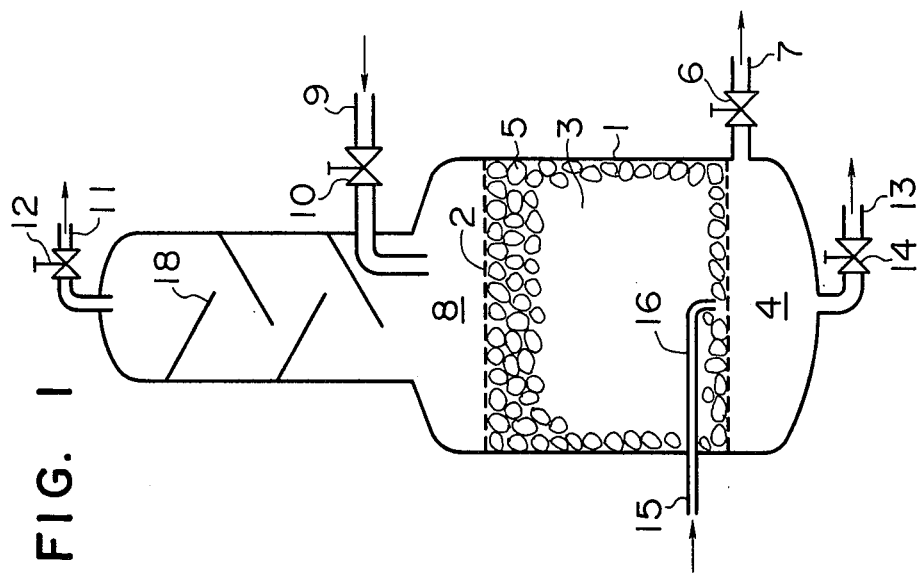
FIG. 1 shows a longitudinally cross-sectional view of a filtration vessel wherein filtering materials of atactic polypropylene were filled midway in a cylindrical vessel having a diameter of about 1 m and a height of 2.5 m so as to form a layer of 1 m.

FIG. 1 shows a simplest embodiment of the method of the present invention wherein a waste water is treated by a sole vessel. This process is not limited only to the treatment of waste water, but also applicable widely to removal of foreign substances from general industrial liquids containing same. The construction of the apparatus employed in this process will be illustrated at first.

In FIG. 1, a filtration vessel 1 may be rectangular or cylindrical or a vessel whose one part is smaller in diameter as shown in the figure. A network-like material 2 suppresses the floating-up of filled materials as filtering material 5 lighter than water, and separates a filtration zone 3 therebelow, from a water-retention part 8 thereabove. In the filtration zone 3, filtering materials lighter than water as mentioned above, preferably atactic polypropylene having a molecular weight of 10,000 or less, e.g. Osman No. 5 ® (dimension: 3 mm or larger), Osman No. 9 ® (3 mm or smaller), etc. supplied by Osman Kogyo Kabushiki Kaisha (Shinkokusai building Room No. 834, 4-1 Marunouchi 3-chome, Chiyodaku, Tokyo), may be employed. Filling of the filtering materials should be made loose to such an extent that the free motion thereof may be possible, and nothing is provided on the boundary between them and a water-retention part 4 below the filtration zone. A discharge pipe for filtered water or an inlet pipe for raw water 7 having a valve 6 is attached to a suitable location at the side part of the lower water-retention part. A discharge pipe for filtered water or an inlet pipe for raw water 9 having a valve 10 is attached to a suitable location at the side part of the upper water-retention part 8. A discharge pipe for light SS and oil matters, having a valve 12 is provided at the uppermost part 11, and a discharge pipe for heavy SS, scum, etc. having a valve 13 is provided at the lowest part 14. Further, an air-blowing pipe 15 having a number of small holes may be provided below the filtration zone or at the lower water-retention part. This is used for back-washing of the filtering materials or aeration of adhered purifying bacteria.

Figure 2:
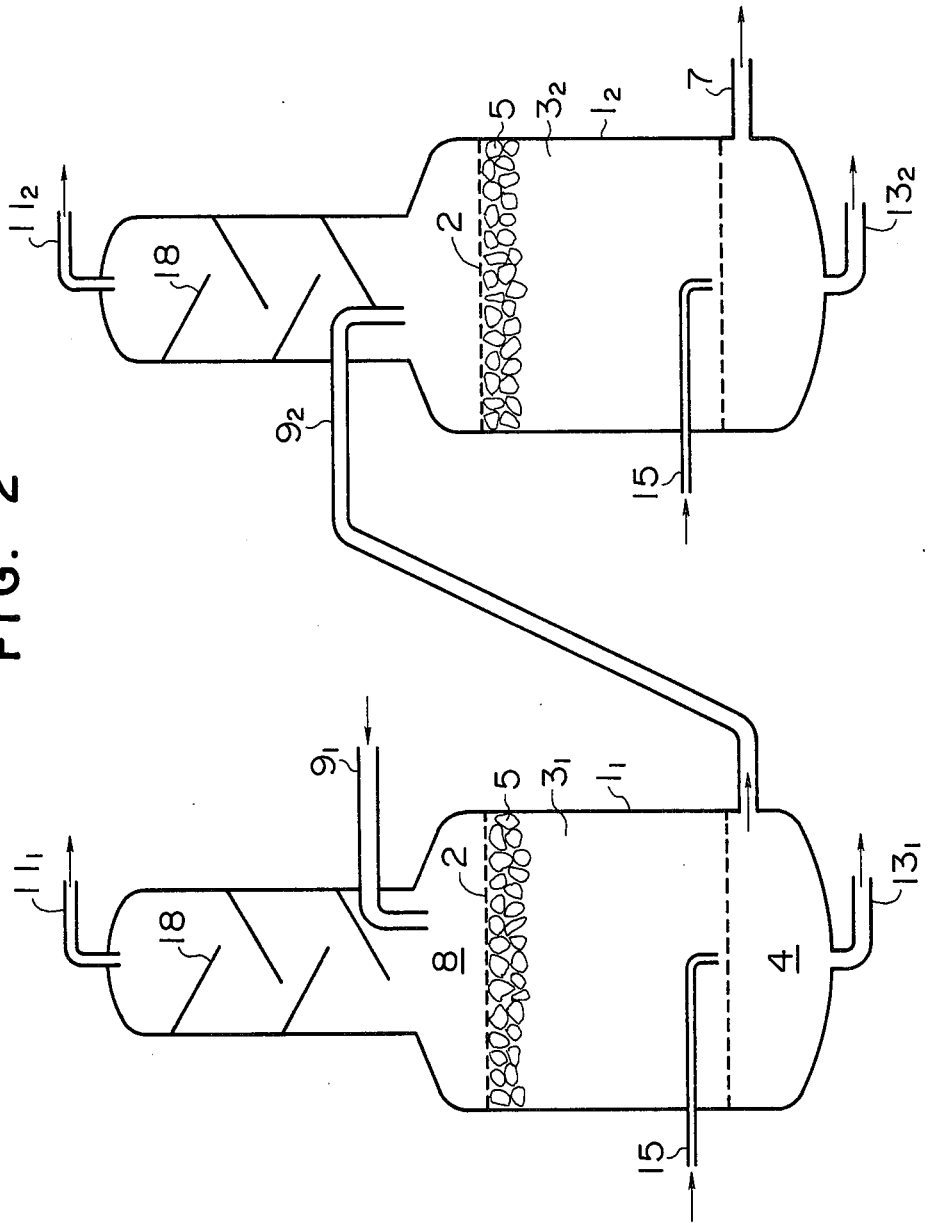
FIG. 2 shows a longitudinally cross-sectional view of an apparatus wherein two of the vessel shown in FIG. 1 are arranged in series.

Beside the apparatus having the above-mentioned construction, an apparatus having two or more of the same apparatus as that of FIG. 1 arranged in series, as shown in FIG. 2, may be employed. Further, by providing a partition 17 in one vessel as shown in FIG. 3, the same effectiveness as that of the apparatus having two vessels arranged in series can be exhibited.

Still further, the method of the present invention may be also effected by using an apparatus shown in FIG. 4. According to this apparatus, a funnel-like liquid passage 20 is provided below a layer $3_1$ in which filtering materials of atactic polypropyrene having a size of about 5-10 mm are contained; SS precipitated from the liquid leaving the end of the foot of the funnel is withdrawn from below by means of a pump in case where the vessel is provided underground, while an ascending liquid passes through a layer $3_2$ of filtering materials having a size of about 1 mm, provided between the foot of the funnel and the inner surface of the vessel, and is withdrawn from the side part of the vessel outside the funnel, by means of a pipe 7.

The method of the present invention may be also carried out by employing an arrangement wherein two upper and lower, different filtering material layers (e.g. upper layer: atactic polypropylene of 9 mm, lower layer: atactic polypropylene of 3 mm) so constructed as shown in FIG. 5.

According to preferable concrete embodiments of the method of the present invention, an apparatus as shown in FIG. 6, an apparatus as shown in FIG. 7 and an apparatus as shown in FIG. 8 may be also employed. In these figures, the same numerals are employed for the parts having the same purposes to clearly appreciate each of the constructions. The subscripts attached to certain numerals show a distinction of first stage and second stage.

The above-mentioned various manners of the present invention can be employed for treating various waste waters such as waste water of car-washing, waste water of kitchen, waste water of food factory; back-washing water of conventional filtration vessels; circulating cooling water; etc.

Next, the concrete using manners of the apparatus having the above-mentioned constructions will be hereinafter illustrated in detail.

In case where a waste water of service water containing substances lighter than SS, oil matters, etc. is treated, said pipe 7 is used as an inlet pipe and said pipe 9 is used as a water-discharging pipe. In case where SS, oil matters and solid matters lighter than water and those heavier than water are both contained in a large amount, a plurality of vessels each having the above-mentioned construction but using the inlet pipe and the discharging pipe in reverse way, may be arranged in series as shown in FIG. 2, or a partition may be provided in one vessel as shown in FIG. 3 whereby the same effectiveness as in the case of two vessels arranged in series is exhibited.

As oily matters, SS, etc. gradually aggregate and grow into larger particles on the surface of atactic polyproplyene or porous synthetic resin materials as filtering materials, lighter substances gather above the upper water-retention part, while heavier substances precipitate at the bottom of the lower water-retention part. Thus the former is withdrawn from pipe 11 and the latter is withdrawn from pipe 13. When air is supplied from pipe 15, a turbulent flow occurs in water and bubbles are formed through small holes 16, whereby the gas-liquid contact is activated and the growth and separation of slime on the surface of the filtering materials are promoted. When air is frequently or always supplied, an activated sludge treatment which does not necessitate any returning sludge can be effected.

In case where an upper pipe 9 is used as an inlet pipe and a lower pipe 7 is used as a discharge pipe, it is preferable to use as filtering material 5, atactic polypropylene having superior properties as an agent for adsorbing oils and for causing particles to grow into larger ones, and those having a dimension of 3 mm or larger are preferable. In general, however, a mixture of those having various sizes of about 1 to 50 mm may be employed.

When supply of an oil-containing waste water through inlet pipe 9 into vessel 1 at a given flow rate in the state where water-discharge pipe 9 is closed or slightly opened, is started, SS and oil matters alone contained in the oil-containing waste water are adsorbed onto filtering materials 5 filled in filtration zone 3, while water passes through filtration zone 3 and is retained at the lower water-retention part. When the supply of the oil-containing waste water is still continued, the level of water is gradually elevated. Since filtering materials 5 are in a somewhat movable state, particles of SS and oil matters adhered onto the surfaces of the filtering materials 5 and being in a half-aggregated state due to the friction of the filtering materials with each other, rise as the level of water rises, and advance to the upper part of treating vessel 1. At this time, if valve 6 attached to water-discharge pipe 7 is opened and adjusted so that the amount of filtered water discharged from water-discharge pipe 7 may be slightly smaller than the amount of the oil-containing waste water supplied from the inlet pipe, then the difference between the supplied amount and the discharged amount results in the elevation of water-pressure inside the treating vessel. Thus, by opening valve 12, oil matters are discharged from upper oil-discharge pipe 11.

The method of the present invention will be further illustrated by way of the following Examples.

EXAMPLE 1

Two of the apparatus as shown in FIG. 1 were arranged in series, the first vessel being employed in an upper part supply manner, while the second vessel being in a lower part supply manner. Particles of 3 mm or larger size of an atactic polypropylene having a molecular weight of about 10,000 were filled therein so as to form a layer of 1 m thick. Using the above-mentioned apparatus and materials, a waste water containing 30,000 ppm of a spent water from marine product processing (mainly whale oil) was treated. Oil matters could be reduced down to 3 ppm without blowing-into of air. Further, 30 days or longer operation could be continued without exchanging filtering materials and also without any reduction in performance.

EXAMPLE 2

Using the apparatus shown in FIG. 3, a spent water from marine product processing (from a factory preparing minced flesh for "Kamaboko" (boiled fish-paste)) was treated. Particles of 3 mm or larger size of atactic polypropylene were filled so as to form a layer of 1 m thick, to form a filtration layer. While blow-into of air was continuously carried out, oily matters were separated. Successively, at the second stage, treatment was carried out using particles of 3 mm or smaller size of atactic polypropylene. By such two stage treatment, 470 ppm of COD could be reduced down to 80 ppm. Further, although the raw water contained 0.6% of proteins, a discharge water containing 7% of proteins (concentrated) could be obtained. When the number of treatment stages was further increased to 7 stages, the ppm of discharged water could be reduced down to 1 ppm or less.

EXAMPLE 3

A waste water formed by back-washing a sand filtration apparatus for water for industrial utility was treated. The apparatus shown in FIG. 1 was employed in a lower supply manner. Particles of 3 mm or smaller size of atactic polypropylene having a molecular weight of about 10,000 were filled so as to form a layer of 1 m. Thus one step treatment was carried out without blowing-into of air. As a result, 80 ppm of SS could be reduced down to 1 ppm.

EXAMPLE 4

In a factory using a circulating cooling water (and at the same time using a well water as a make up water) in a closed system, the apparatus shown in FIG. 1 was employed by inserting it into the system in the manner same with that of Example 3. Operation was carried out for two years in a state where no water was discharged. As a result, the original water quality of a pH of 7.5, a conductivity of 295 (ohm-cm), a total hardness of 136.0, a chlorine ion content of 6.2 and a silica content of 57.4 changed to that of a pH of 7.6, a conductivity of 242 (ohm-cm), a total hardness of 91.6, a chlorine ion content of 7.0 and a silica content of 40.0.

From the foregoing it can be seen that a state of almost no change of water quality could be maintained over 2 years.

EXAMPLE 5

A liquid containing 0.5% of SS and 7% of a mineral oil in methanol was treated using the apparatus shown in FIG. 1. As a result, complete removal could be effected. Further, a liquid containing 1% of SS in glycerine was treated using the same apparatus. As a result, complete cleaning could be effected.

What is claimed is:

1. A method for continuously separating foreign substances from a liquid containing same by filtration, which comprises:
   (a) passing a liquid containing foreign substance through a filtration zone that is filled with a floating mass of particulate filter material having a specific gravity equal to or lower than that of said liquid and being disposed in an unfixed position in said floating mass so that they may move with respect to each other within said floating mass,
   (b) continuing the passage of said liquid through said floating mass until said foreign substances (1) adhere onto the surfaces of said filter particles, and (2) slowly grow into aggregates of foreign substances that are peeled from the filter particles by the contacting motion of said filter particles with each other in said floating mass brought about by the flow of said liquid therethrough, and
   (c) allowing resulting aggregates of foreign substances peeled from said filter particles to separate from said floating mass, and
   (d) removing separated aggregates of foreign substances by causing them to move outwardly through said floating mass countercurrently to the liquid passing through said floating mass, whereby the surfaces of said filter particles are always kept clean and filtration can be continuously carried out without clogging of the space between filter particles.

2. A process according to claim 1 wherein the particulate filter material comprises atactic polypropylene.

3. A process according to claim 1 wherein the particulate filter material comprises atactic ethylene-propylene copolymer.

4. A process according to claim 1 which additionally includes introducing air into said floating mass of particulate filter material during filtration so as to promote (1) the growth of said foreign substances into larger aggregates (2) the peeling off of said aggregates from said filter particles and (3) the activation of any purifying bacterial contained in said liquid.

5. A process according to claim 4 wherein the particulate filter material comprises atactic polypropylene.

6. A process according to claim 4 wherein the particulate filter material comprises atactic ethylene-propylene copolymer.

* * * * *